US012145626B1

(12) United States Patent
Gayaka et al.

(10) Patent No.: US 12,145,626 B1
(45) Date of Patent: Nov. 19, 2024

(54) SYSTEM FOR MAINTAINING ENTITY IDENTIFIER WITH AN AUTONOMOUS MOBILE DEVICE

(71) Applicant: AMAZON TECHNOLOGIES, INC., Seattle, WA (US)

(72) Inventors: Shreekant Gayaka, San Jose, CA (US); Menghan Zhang, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 392 days.

(21) Appl. No.: 17/452,490

(22) Filed: Oct. 27, 2021

(51) Int. Cl.
| | |
|---|---|
| *B60W 60/00* | (2020.01) |
| *G05D 1/00* | (2024.01) |
| *G06T 7/246* | (2017.01) |
| *G06T 7/73* | (2017.01) |

(Continued)

(52) U.S. Cl.
CPC ....... *B60W 60/0027* (2020.02); *G05D 1/0246* (2013.01); *G06T 7/246* (2017.01); *G06T 7/73* (2017.01); *G06V 20/10* (2022.01); *G06V 40/10* (2022.01); *B60W 2554/4041* (2020.02); *B60W 2554/4042* (2020.02); *B60W 2554/4043* (2020.02); *B60W 2554/4044* (2020.02); *G05D 1/024* (2013.01); *G05D 1/027* (2013.01); *G06T 2207/30196* (2013.01)

(58) Field of Classification Search
CPC ..... B60W 60/0027; B60W 2554/4041; B60W 2554/4042; B60W 2554/4043; B60W 2554/4044; G05D 1/0246; G05D 1/024; G05D 1/027; G06T 7/246; G06T 7/73; G06T 2207/30196; G06V 20/10; G06V 40/10

USPC ........................................................ 701/1, 25
See application file for complete search history.

(56) References Cited

U.S. PATENT DOCUMENTS

| | | | |
|---|---|---|---|
| 8,359,122 B2 * | 1/2013 | Koselka | G08B 21/043 |
| | | | 700/250 |
| 8,799,201 B2 | 8/2014 | James et al. | |
| 9,323,250 B2 * | 4/2016 | Wang | B25J 9/1689 |

(Continued)

OTHER PUBLICATIONS

"Introduction to OpenCV Tracker", Jul. 5, 2021, 2 pgs. Retrieved from the Internet: URL: https://docs.opencv.org/4.5.3/d2/d0a/tutorial_introduction_to_tracker.html.

(Continued)

*Primary Examiner* — Jaime Figueroa
(74) *Attorney, Agent, or Firm* — Lindauer Law, PLLC

(57) ABSTRACT

An autonomous mobile device (AMD) that interacts with a user operates more effectively when able to persist an entity identifier across time with a particular user. Sensor data, such as a set of image frames, is acquired over time and used to determine locations of the user in the physical space. An entity identifier may be associated with the user as depicted in each frame, to allow the AMD to distinguish one user from another. However, due to changes in orientation, appearance, lighting, and so forth, different entity identifiers may be assigned across different frames, even though the user is the same. Information about the location at different times is used to establish a relationship between a root entity identifier and the entity identifiers in individual frames, allowing for consistent operation with respect to the particular user associated with the root entity identifier.

20 Claims, 7 Drawing Sheets

(51) Int. Cl.
*G06V 20/10* (2022.01)
*G06V 40/10* (2022.01)

(56) References Cited

U.S. PATENT DOCUMENTS

| | | | | |
|---|---|---|---|---|
| 10,424,068 B2* | 9/2019 | Zheng | | G06T 7/174 |
| 10,445,593 B1* | 10/2019 | Mathiesen | | G06V 20/53 |
| 10,579,912 B2* | 3/2020 | Holtmann | | H04L 67/12 |
| 10,591,921 B2* | 3/2020 | Wang | | B25J 11/009 |
| 11,388,334 B2* | 7/2022 | Li | | H04N 23/64 |
| 11,657,617 B1* | 5/2023 | Mathiesen | | H04N 7/181 |
| | | | | 382/103 |
| 11,810,345 B1* | 11/2023 | Gayaka | | G06T 7/70 |
| 11,858,143 B1* | 1/2024 | Liu | | G05D 1/243 |
| 2002/0051578 A1* | 5/2002 | Imagawa | | G06V 10/443 |
| | | | | 382/224 |
| 2005/0216126 A1* | 9/2005 | Koselka | | G08B 21/0423 |
| | | | | 901/2 |
| 2007/0198129 A1* | 8/2007 | Koselka | | G08B 21/0461 |
| | | | | 700/250 |
| 2011/0288684 A1* | 11/2011 | Farlow | | B25J 19/023 |
| | | | | 901/1 |
| 2012/0148093 A1 | 6/2012 | Sharma | | |
| 2012/0173018 A1* | 7/2012 | Allen | | B25J 11/008 |
| | | | | 700/245 |
| 2012/0316680 A1 | 12/2012 | Olivier, III et al. | | |
| 2013/0325244 A1* | 12/2013 | Wang | | G16H 40/67 |
| | | | | 701/26 |
| 2017/0024877 A1* | 1/2017 | Versace | | G06F 18/253 |
| 2017/0140213 A1* | 5/2017 | Brandt | | G06V 40/173 |
| 2018/0088583 A1* | 3/2018 | Wang | | G05D 1/0217 |
| 2018/0157916 A1* | 6/2018 | Doumbouya | | G06V 40/103 |
| 2018/0260415 A1* | 9/2018 | Gordo Soldevila | | |
| | | | | G06F 16/5838 |
| 2018/0361584 A1* | 12/2018 | Williams | | B25J 9/1679 |
| 2019/0095946 A1* | 3/2019 | Azout | | G06Q 30/0277 |
| 2019/0114799 A1* | 4/2019 | Takahata | | G06V 20/58 |
| 2019/0130202 A1* | 5/2019 | Doumbouya | | G06V 40/103 |
| 2019/0147226 A1* | 5/2019 | Yip | | G06V 10/60 |
| | | | | 382/118 |
| 2019/0311225 A1* | 10/2019 | Nomoto | | G06V 10/761 |
| 2020/0050206 A1* | 2/2020 | Deyle | | G05D 1/0261 |
| 2021/0136292 A1* | 5/2021 | Hoch | | H04N 23/611 |
| 2021/0368094 A1* | 11/2021 | Li | | G06N 20/00 |
| 2022/0026920 A1* | 1/2022 | Ebrahimi Afrouzi | | |
| | | | | G05D 1/0219 |
| 2022/0066456 A1* | 3/2022 | Ebrahimi Afrouzi | | |
| | | | | A47L 9/2873 |
| 2022/0207259 A1* | 6/2022 | Zhang | | G06T 7/73 |

OTHER PUBLICATIONS

"Install opencv_contrib Tracking package", ROS Answers, Oct. 12, 2017, 3 pgs. Retrieved from the Internet: URL: https://answers.ros.org/question/272840/install-opencv_contrib-tracking-package/.

Collins, Robert, "Introduction to Mean-Shift Tracking", 35 pgs. Retrieved from the Internet: URL: http://www.cse.psu.edu/~rtc12/CSE598C/meanshiftIntro.pdf.

"CS231M—Mobile Computer Vision, Lecture 7, Optical flow and tracking", Stanford University, 55 pgs. Retrieved from the Internet: URL: https://web.stanford.edu/class/cs231m/lectures/lecture-7-optical-flow.pdf.

Iter, et al., "Target Tracking with Kalman Filtering, KNN and LSTMs", Dec. 17, 2016, 7 pgs. Retrieved from the Internet: URL: http://cs229.stanford.edu/proj2016/report/IterKuckZhuang-TargetTrackingwithKalmanFilteringKNNandLSTMs-report.pdf.

Mallick, Satya, "Object Tracking using OpenCV (C++/Python)", Feb. 13, 2017, 12 pgs. Retrieved from the Internet: URL: https://learnopencv.com/object-tracking-using-opencv-cpp-python/.

Rosebrock, Adrian, "Simple object tracking with OpenCV", PyImageSearch, Jul. 8, 2021, 111 pgs. Retrieved from the Internet: URL: https://www.pyimagesearch.com/2018/07/23/simple-object-tracking-with-opencv/.

* cited by examiner

SYSTEM FOR MAINTAINING ENTITY IDENTIFIER WITH AN AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
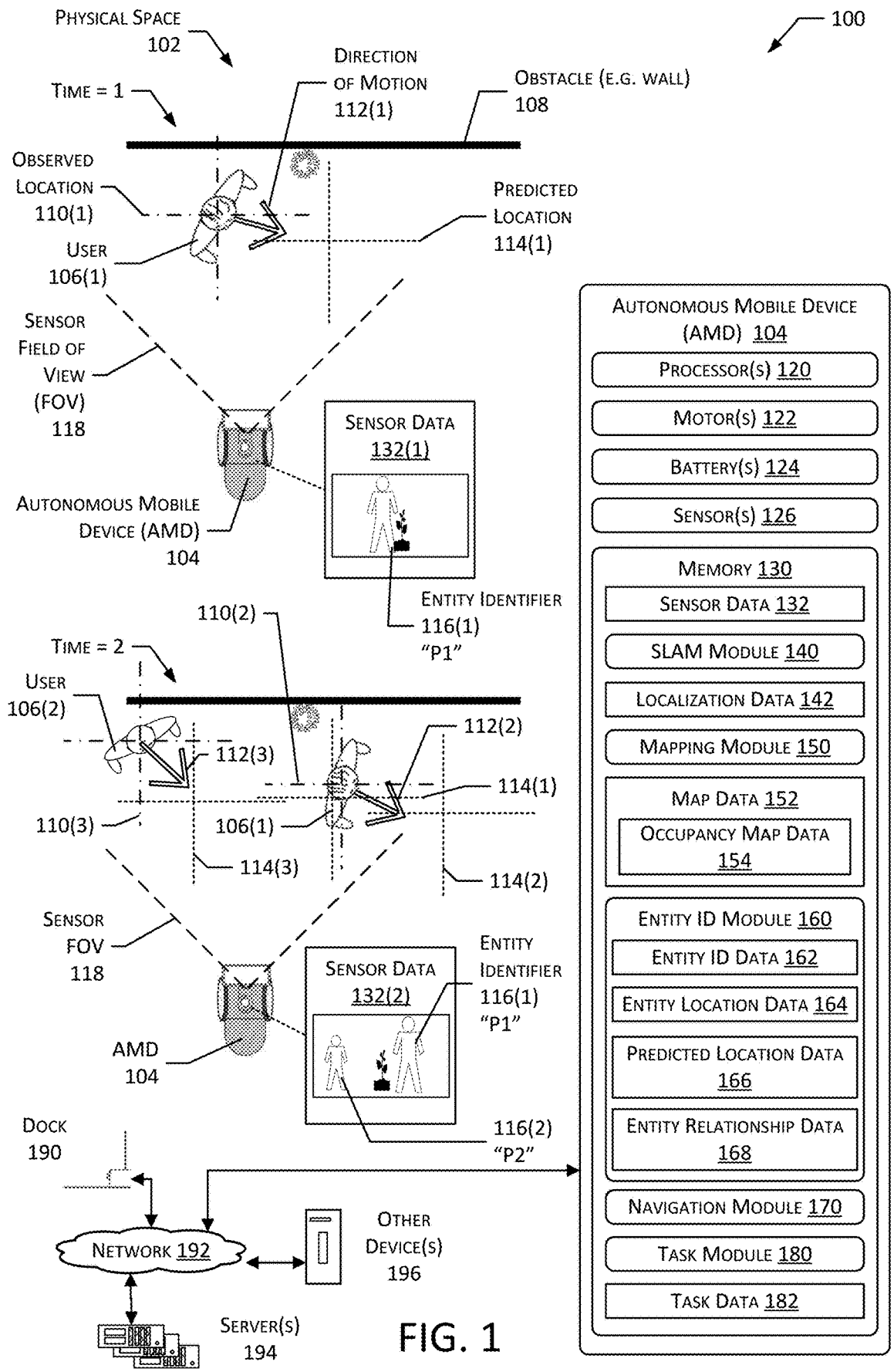
FIG. 1 illustrates a system for an Autonomous Mobile Device (AMD) to maintain an entity identifier, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is capable of autonomous movement from one location in a physical space to another location without being controlled by a user. A user may interact with the AMD and the AMD may perform tasks that may involve the user, the AMD, or both moving in the physical space. The AMD may perform tasks such as displaying information, accepting input, and so forth. The AMD may operate with respect to a particular user. For example, if user "Alice" instructs the AMD to follow, the AMD would be expected to follow "Alice" and not start following "Bob". The AMD may assign an entity identifier (ID) to an entity that is detected by one or more sensors.

The entity ID is indicative of a particular person, a particular robot, a particular pet, or other entity that may move and interact with the AMD. The entity ID may be distinct from associating an entity with a particular user account. For example, the entity ID may be an arbitrary value such as "P1" that is independent of an actual identity, such as "Alice".

Traditional systems may result in entity IDs that change from time to time. For example, systems that use a camera to acquire sensor data comprising images and may assert an entity ID for each face detected in an image. For example, a machine learning system may be trained to recognize a face or body depicted in an image and designate a bounding box around that person, and associate an entity ID with that bounding box. A particular entity ID may be persisted from frame to frame, such as based on a bounding box around the face being within a threshold number of pixels from one frame to the next. However, the entity ID may change from time to time. Changes in position between the sensor and the user, changes in lighting, and so forth may result in the entity ID for a particular user or other entity changing from one frame to another. For example, frame 1 may be associated with entity ID "P1", frame 2 is associated with entity ID "P2", and frame 3 is associated with entity IDs "P3" and "P1".

As a result of changing entity IDs, it is possible for several different entity IDs to actually refer to a single entity, such as a particular person. However, traditional systems have been unable to cope with such situations. As a result, erratic, uncertain, or improper behavior of an AMD may result. Continuing the example, if "P2" and "P1" actually refer to the same person "Alice", then the AMD should follow the entity associated with the entity ID "P2". Likewise, if "P3" is determined to not be associated with "P1", then the AMD should not follow the entity associated with the entity ID "P3".

Described in this disclosure are techniques and systems to determine entity relationship data that determines whether entity IDs are associated with the same entity. A data structure, such as a tree, maintains a root entity ID to which other (e.g. "leaf") entity ID's may be associated based on one or more assessments. If a "leaf" entity ID is subsequently determined to be associated with a different root entity ID, the association of the leaf may be changed to that different root entity ID.

The assessments may include a distance comparison between an observed location in the physical space and a predicted location based on previous motion data. For example, at time t=1 the entity ID "P1" is predicted to be at a predicted location at time t=2. At time t=2 an entity with an entity ID "P2" is determined to be less than a threshold distance from that predicted location, and so is deemed to be associated with the entity ID "P1". The time interval or time duration between these times may also be specified. For example, the comparison may be limited to a predicted location for a time that is within 500 milliseconds of an observed location.

The assessments may include comparison of confidence values associated with the entity IDs. For example, a machine learning system may provide as output a confidence value indicating a likelihood that the determined entity ID is correct. Under ideal conditions such as sensor angle relative to the entity, lighting, and so forth, the confidence value may be 0.99 indicating a very high confidence. In comparison, under poor conditions such as oblique sensor angle relative to the entity, poor lighting, and so forth, the confidence value may be 0.11 indicating a low confidence value. Based on the confidence value, an association between a given entity ID and another entity ID may be made or removed. For example, at time t=1 the confidence value for entity ID "P1" is 0.99. At time t=2 the confidence value for entity "P2" is 0.98. Given the high confidence, "P2" may be deemed to not be associated with "P1". In comparison if at time t=2 the confidence value for entity "P2" is 0.05, the entity ID "P2" may be deemed to be associated with the entity ID "P1".

Another assessment may be a determination of common occurrence. If two or more entity IDs are determined to be simultaneously present in the same data, they may be deemed to not refer to the same entity. For example, if entity IDs "P1", "P3" and "P4" are all determined to be depicted in the same frame of image data, they may be deemed to be separate entities and thus not associated with one another. In some implementations, common occurrence may be based on multiple instances of data, such as common occurrence in a minimum number of consecutive frames.

Based on these assessments, the system is able to provide entity relationship data that specifies entity IDs that are deemed to relate to the same entity, while distinguishing entities. While the entity relationship data may change over time, the system provides stability, in particular over relatively short time spans, preventing erratic behavior and improving the overall operation of the AMD.

The system is computationally efficient, allowing for execution with extremely low latency using minimal compute resources. This allows for execution on relatively inexpensive hardware, while providing low latency that improves operation and the user experience.

Illustrative System

FIG. 1 illustrates a system 100 for an autonomous mobile device (AMD) 104 to maintain entity identifiers, according to some implementations.

A physical space 102 includes an autonomous mobile device (AMD) 104. The physical space 102 may be one or more floors within a residence, office, vessel, and so forth. The physical space 102 may include various obstacles 108 such as walls, furniture, toys, ledges, or stairs that the AMD 104 is unable to traverse, may occlude sensor operation, and so forth. Various entities may be present in the physical space 102. These entities may include users 106, other AMDs 104, pets, and so forth. For ease of illustration, and not as a limitation, the entities are depicted and described as users 106. However, the same techniques and systems described herein may be used for combinations of users 106, AMDs 104, pets, and so forth.

In this illustration, a portion of the physical space 102 is shown at a first time t=1 and a second time t=2. At the first time t=1 a first user 106(1) is present in the physical space 102. The user 106 may be associated with one or more of an observed location 110, a direction of motion 112, or a predicted location 114. The observed location 110 is a location, with respect to the physical space 102, of the user 106. For example, the observed location 110 may be specified as coordinates with respect to an origin of a map. In some implementations, the coordinates may specify the location, relative to the origin, in a plane. For example, the coordinates may specify a location with respect to an X axis and an orthogonal Y axis. The direction of motion 112 is indicative of a direction, with respect to a reference direction, that the user 106 is determined to be moving in. The predicted location 114 is an expected location of the user 106 at a later time. For example, based on the observed location 110, given an observed speed of the user 106 (not shown), and the estimated direction of motion 112, a predicted location 114 may be calculated. In this illustration, at the first time t=1 the first user 106(1) has a first observed location 110(1), a first direction of motion 112(1), and a first predicted location 114(1).

The AMD 104 includes one or more sensors 126. As discussed below, the sensors 126 may have a sensor field of view (FOV) 118. Sensor data 132 may be acquired for the volume within the sensor FOV 118. In this illustration, the sensor 126 comprises a camera 344, and sensor data 132(1) is an image acquired during the first time t=1. The first user 106(1) is shown within the image.

At the second time t=2, the first user 106(1) has moved, and now is at a second observed location 110(2), is moving in a second direction of motion 112(2), and is associated with a second predicted location 114(2). The second observed location 110(2) is proximate to the first predicted location 114(1). Also, at the second time t=2, a second user 106(2) has entered the sensor FOV 118. The second user 106(2) may also be associated with one or more of a third observed location 110(3), a third direction of motion 112(3), or a third predicted location 114(3). In the resulting sensor data 132(2), the first user 106(1) and the second user 106(2) are both visible.

The AMD 104 may include one or more hardware processors 120 (processors) configured to execute one or more stored instructions. The processors 120 may comprise one or more cores. The processors 120 may include microcontrollers, systems on a chip, field programmable gate arrays, digital signal processors, graphic processing units, general processing units, and so forth.

One or more motors 122 or other actuators enable the AMD 104 to move from one location in the physical space 102 to another. For example, a motor 122 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include battery(s) 124 to provide electrical power for operation of the AMD 104. The battery 124 may be rechargeable, allowing it to store electrical energy obtained from an external source, such as from a dock 190. In other implementations, a wireless power receiver may be used to provide power for operation of the AMD 104, recharge the battery 124, and so forth.

The AMD 104 may include one or more sensors 126. For example, the sensors 126 may include microphones, time-of-flight (TOF) sensors, cameras, LIDAR, inductive sensors, and so forth. The sensors 126 may generate sensor data 132. The sensors 126 are discussed in more detail with regard to FIG. 3.

The AMD 104 includes one or more memories 130. The memory 130 may comprise one or more non-transitory computer-readable storage media (CRSM). The memory 130 may store the sensor data 132 resulting from operation of the one or more sensors 126. The memory 130 may also store one or more modules.

A SLAM module 140 determines localization data 142. The localization data 142 is indicative of a pose of the AMD 104 in the physical space 102 at a particular time. The localization data 142 may be based on some external reference, such as features visible in the physical space 102, data from inertial sensors, and so forth. For example, a feature within an image may comprise a shadow, edge of a door frame depicted in the image, and so forth.

A pose is indicative of a location and orientation within the physical space 102. For example, pose data may be specified as coordinates of (+1.1, 2.3, 1.1, 37°, 12°, 301°). The coordinates may be specified with respect to an origin. The physical location may be relative to an origin point, while orientation may be relative to a reference direction. The six coordinate values comprise a coordinate value of +1.1 meters (m) along an X-axis, a coordinate value of 2.3 m along a Y-axis, a coordinate value of 1.1 m along a Z-axis, and a coordinate value indicating rotation with respect to each of the axes, such as an orientation of 301 degrees relative to a specified direction with respect to rotation about a Z-axis. A Z-axis coordinate value may be indicative of a height value or elevation value. A horizontal plane may be defined by the X and Y axes.

During operation, the AMD 104 may determine localization data 142 that includes the pose based on the sensor data 132. By knowing where the AMD 104 is, and which direction the sensors 126 of the AMD 104 are pointing, as provided by the localization data 142, the sensor data 132 may be used to determine information about where the obstacles 108 are in the physical space 102, where the users 106 are, and so forth. A set of poses generated overtime may describe a given AMD 104 trajectory. For example, trajectory data may comprise a time series of pose data.

The AMD 104 may include a mapping module 150. The mapping module 150 determines map data 152 that may comprise one or more of feature data or occupancy map data 154. The feature data may comprise information about features visible from a particular pose. The occupancy map data 154 is a representation of the physical space 102 that includes obstacles 108 and their locations in the physical space 102.

Based on the sensor data 132, the entity identification (ID) module 160 determines entity ID data 162 indicative of an entity identifier (ID). For example, a machine learning system, such as a trained neural network, may process image data as input and attempt to determine a bounding box around the entity represented by that image data. Based on one or more features represented by the sensor data 132, an entity ID 116 may be assigned. For example, as shown in this illustration, the first user 106(1) as depicted in the sensor data 132(2) is associated with a first entity identifier 116(1) having a value of "P1" while the second user 106(2) as depicted in the sensor data 132(2) is associated with a second entity identifier 116(2) having a value of "P2". In some implementations, an entity ID 116 may be associated with a confidence value that is indicative of a likelihood that the entity ID 116 is correct.

The entity ID data 162 differentiates one entity from another. However, during operation, in some situations different entity IDs 116 may be assigned to the same entity. For example, as a user 106 moves, as the AMD 104 moves, as lighting conditions change, and so forth, the same user 106 may inadvertently be associated with several different entity IDs 116 at different times. The process of associating a plurality of entity IDs 116 with a common root entity is discussed in more detail below.

The entity ID module 160 may also determine entity location data 164. For example, the entity location data 164 is indicative of the observed location 110 associated with a particular entity ID 116. The entity location data 164 may be determined based on various techniques, such as stereovision, time-of-flight measurement, and so forth. For example, the entity location data 164 may be determined using a pair of stereo cameras mounted on the AMD 104. In another example, the entity location data 164 may be determined based on depth data obtained from an optical time-of-flight sensor.

The entity ID module 160 may determine predicted location data 166. For example, at least two previous observed locations 110 may be used to calculate a speed (not shown) and the direction of motion 112 of the entity. Based on the speed and direction of motion 112, the predicted location data 166 may be determined. In another implementation, the direction of motion 112 may be determined based on other processing of the sensor data 132. For example, an image-based approach may attempt to determine the direction of motion 112 based on appearance of the user 106. In some implementations, the speed may be calculated based on previous displacement, direct measurement, or may be assumed to be a fixed value. For example, direct measurement may comprise radar or ultrasound operating in a doppler mode to determine the speed of the entity relative to the AMD 104.

The entity ID module 160 maintains entity relationship data 168. The entity relationship data 168 associates one or more entity IDs 116 with other entity IDs 116 indicated by the entity ID data 162. As mentioned above, in some situations different entity IDs 116 may be assigned at different times to the same user 106. The entity ID module 160 may determine the entity relationship data 168 that indicates which entity IDs 116 are related to one another. Over time, the entity relationships may change as additional information is determined. For example, entity ID "P1" may be associated with "P3" until both "P1" and "P3" are observed simultaneously in the same frame of sensor data 132, in which case that association is removed. The entity ID module 160 may consider data that is acquired at less than a threshold time duration, while disregarding data that is greater than a threshold time duration. For example, the entity ID module 160 may specify a threshold time duration of 100 milliseconds (ms). Continuing the example, the entity ID module 160 may use data that is acquired within the last 100 ms to determine the entity relationship data 168, while disregarding data that is older. The determination of the entity relationship data 168 is discussed in more detail below.

A navigation module 170 provides the AMD 104 with the ability to navigate within the physical space 102 without real-time human interaction. The navigation module 170 may use the occupancy map data 154 to determine a path along which the AMD 104 may move to perform a task, such as following a particular entity. For example, the AMD 104 may be instructed by user 106(1) to "follow me". Responsive to this, the entity ID module 160 provides consistent information about the resulting entity ID(s) 116 associated with the user 106(1), and the information about the corresponding entity location data 164 may be used to determine a path plan that when executed moves the AMD 104 to follow the user 106(1).

The AMD 104 may utilize one or more task modules 180. The task module 180 comprises instructions that, when executed, provide one or more functions. The task modules 180 may perform functions such as finding a user, following a user, presenting output on output devices of the AMD 104, performing sentry tasks by moving the AMD 104 through the physical space 102 to determine the presence of unauthorized people, and so forth. Tasks may be indicated by task data 182, and the task data 182 may be stored in a queue or some other memory structure within the memory 130.

The AMD 104 may use a network 192 to access one or more servers 194. The servers 194 may process data from the AMD 104. The servers 194 may send data to the AMD 104 that may be subsequently used to operate the AMD 104.

The AMD 104 may also communicate with other devices 196. The other devices 196 may include one or more devices that are within the physical space 102 such as a home or associated with operation of one or more devices in the physical space 102. For example, the other devices 196 may include a doorbell camera, a garage door opener, a refrigerator, washing machine, and so forth. In some implementations, the other devices 196 may include other AMDs 104, vehicles, and so forth.

Figure 2:
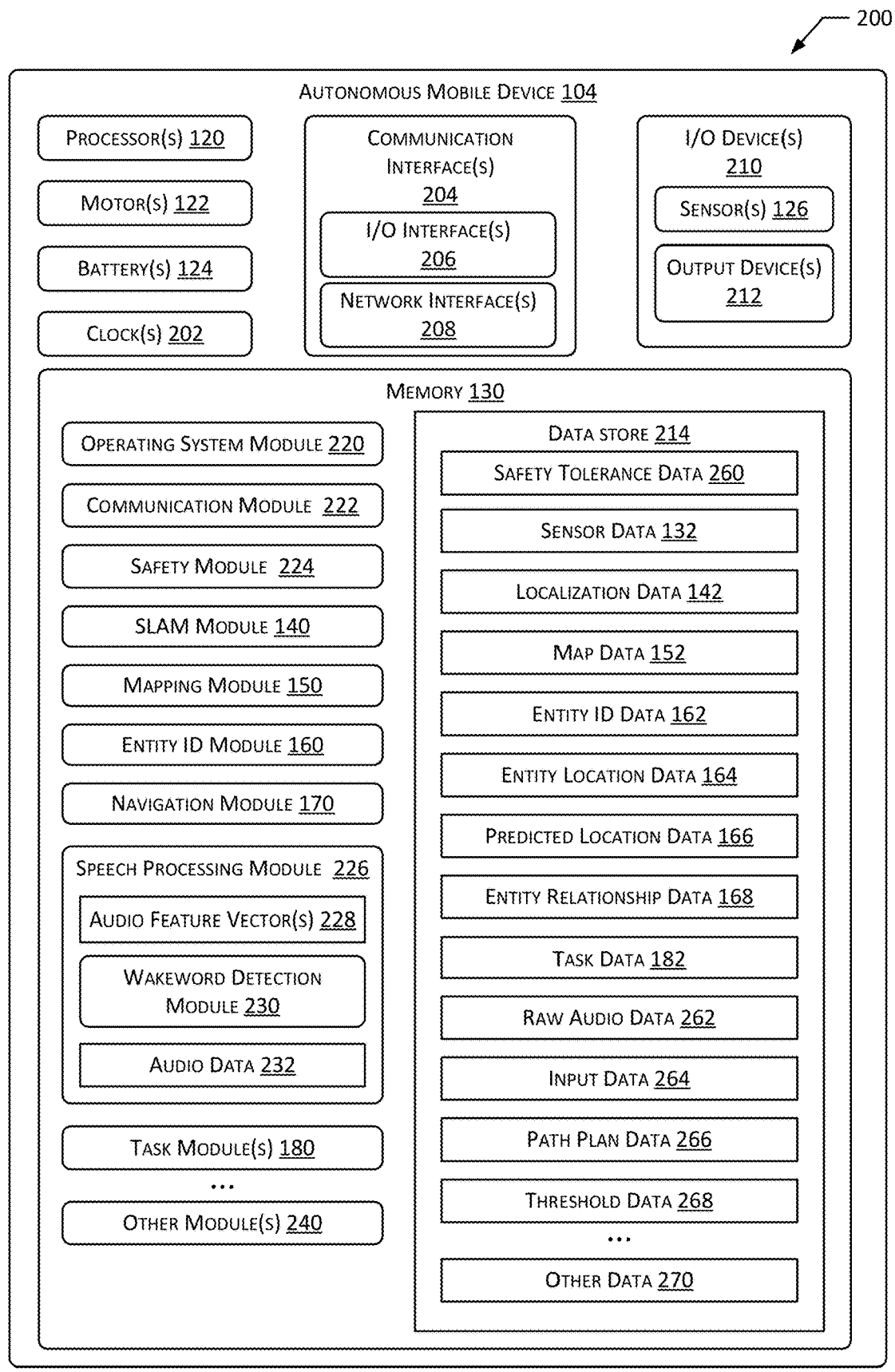
FIG. 2 is a block diagram of the components of the AMD, according to some implementations.

FIG. 2 is a block diagram 200 of the components of the AMD 104, according to some implementations.

As described, the AMD 104 may include one or more hardware processors 120 (processors) configured to execute one or more stored instructions. As described above, the AMD 104 may include one or more motors 122 or other actuators to enable the AMD 104 to move from one location in the physical space 102 to another.

The AMD 104 may include one or more batteries 124 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 120 may use data from the clock 202 to associate a particular time with an action, sensor data 132, and so forth.

The AMD 104 may include one or more communication interfaces 204 such as input/output (I/O) interfaces 206, network interfaces 208, and so forth. The communication interfaces 204 enable the AMD 104, or components thereof, to communicate with other devices 196 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 126, keyboard, mouse, scanner, and so forth. The I/O devices 210 may also include output devices 212 such as one or more of a motor 122, light, speaker, display, projector, printer, and so forth. The output devices 212 are discussed in more detail with regard to FIG. 3. In some embodiments, the I/O devices 210 may be physically incorporated with the AMD 104 or may be externally placed.

The network interfaces 208 may be configured to provide communications between the AMD 104 and other devices 196 such as other AMDs 104, the dock 190, routers, access points, and so forth. The network interfaces 208 may include devices configured to couple to personal area networks (PANs), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104. The network interfaces 208 are discussed in more detail with regards to FIG. 3.

As shown in FIG. 2, the AMD 104 includes one or more memories 130. The memory 130 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 130 provides storage of computer-readable instructions, data structures, program modules, and other data for the operation of the AMD 104. Example functional modules are shown stored in the memory 130, although the same functionality may alternatively be implemented in hardware, firmware, or as a system on a chip (SoC).

The memory 130 may include at least one operating system (OS) module 220. The OS module 220 is configured to manage hardware resource devices such as the I/O interfaces 206, the I/O devices 210, the communication interfaces 204, and provide various services to applications or modules executing on the processors 120. The OS module 220 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 130 may be a data store 214 and one or more of the following modules. These modules may be executed as foreground applications, background tasks, daemons, and so forth. The data store 214 may use a flat file, database, linked list, tree, executable code, script, or other data structure to store information. In some implementations, the data store 214 or a portion of the data store 214 may be distributed across one or more other devices 196 including other AMDs 104, servers 194, network attached storage devices, and so forth.

A communication module 222 may be configured to establish communication with other devices 196, such as other AMDs 104, an external server 194, a dock 190, and so forth. The communications may be authenticated, encrypted, and so forth.

Other modules within the memory 130 may include a safety module 224, a SLAM module 140, the mapping module 150, the entity ID module 160, the navigation module 170, task modules 180, a speech processing module 226, or other modules 240. The modules may access data stored within the data store 214, including safety tolerance data 260, sensor data 132, localization data 142, map data 152, entity ID data 162, entity location data 164, predicted location data 166, entity relationship data 168, task data 182, raw audio data 262, input data 264, path plan data 266, threshold data 268, other data 270, and so forth.

The safety module 224 may access the safety tolerance data 260 to determine within what tolerances the AMD 104 may operate safely within the physical space 102. For example, the safety module 224 may be configured to stop the AMD 104 from moving when an extensible mast of the AMD 104 is extended.

A feature is detectable by a sensor 126. For example, the sensors 126 may include cameras that acquire images of the physical space 102. These images are processed to determine feature data representative of the presence of features in the images, such as edges of doors, shadows on the wall, texture on the walls, and so forth. A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

The SLAM module 140 may provide as output a series of poses, each pose describing a location and rotations in the physical space 102. Each pose may be based, at least in part, on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

The SLAM module 140 may also use data from other sensors 126 such as motor encoders, inertial measurement units (IMU) with one or more accelerometers and gyroscopes, and so forth. For example, the IMU may generate inertial data indicative of rotations or accelerations along particular axes. This inertial data may be integrated to provide information about the movement of the AMD 104.

While the AMD 104 is operating, the sensors 126 may be used to determine sensor data 132 comprising information about the physical space 102. During operation, the mapping module 150 uses the sensor data 132 from various sensors 126 and the localization data 142 to determine information such as where the AMD 104 is, how far the AMD 104 has moved, the presence of obstacles 108, where those obstacles 108 are, and so forth. For example, the sensors 126 may comprise a time-of-flight (TOF) depth camera, ultrasound, radar, and so forth. Depth data from these sensors 126 may be indicative of whether an obstacle 108 is detected or not and includes information about the distance between the sensor 126 and the obstacle 108 and a relative direction, with respect to the sensor 126, of a detected obstacle 108. Sensor data 132 from cameras, LIDAR, or other devices may be processed by the SLAM module 140 to provide localization data 142. Based on this data, the mapping module 150 may determine the map data 152, such as the occupancy map data 154. The occupancy map data 154 represents the physical space 102. For example, the occupancy map data 154 may indicate the location of the obstacles 108.

The physical space 102 may be represented by map data 152 that may comprise a plurality of individual maps. The maps may comprise feature data, occupancy map data 154, and so forth. For example, each floor of a building may be expressed as different feature data and occupancy map data 154.

The entity ID module 160 may determine the entity Id data 162 and entity relationship data 168. Operation of the entity ID module 160 is discussed in more detail with regard to FIGS. 4-7.

The navigation module 170 provides the AMD 104 with the ability to navigate within the physical space 102 without real-time human interaction. The navigation module 170 may use the map data 152 to determine a set of possible paths along which the AMD 104 may move to reach a target pose. One of these paths may be selected and used to determine path plan data 266 indicative of a path. For example, a possible path that is the shortest or has the fewest turns may be selected and used to determine the path. The path is then subsequently used to determine a set of commands that drive the motors 122 connected to the wheels. For example, the navigation module 170 may use the localization data 142 to determine the current location of the AMD 104 within the physical space 102 and determine path plan data 266 that describes the path to the target pose.

The speech processing module 226 may be used to process utterances of the user 106. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 228 that may ultimately be used for processing by various components, such as a wakeword detection module 230, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 192 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 228) representing features/qualities of the raw audio data 262 within each frame. A frame may be a certain period of time, for example a sliding window of 25 ms of audio data 232 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 228 (or the raw audio data 262) may be input into a wakeword detection module 230 that is configured to detect keywords spoken in the audio. The wakeword detection module 230 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 230 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 230 may compare audio data 232 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 232 (which may include one or more of the raw audio data 262 or the audio feature vectors 228) to one or more server(s) 194 for speech processing. The audio data 232 corresponding to audio obtained by the microphone may be processed locally on one or more of the processors 120, sent to a server 194 for routing to a recipient device, or may be sent to the server 194 for speech processing for interpretation of the included speech (either for purposes of enabling voice-communications or for purposes of executing a command in the speech). The audio data 232 may include data corresponding to the wakeword, or the portion of the audio data 232 corresponding to the wakeword may be removed by the AMD 104 before processing by the navigation module 170, before sending to the server 194, and so forth.

The speech processing module 226 may include or access an automated speech recognition (ASR) module. The ASR module may accept as input raw audio data 262, audio feature vectors 228, or other sensor data 132 and so forth and may produce as output the input data 264 comprising a text string or other data representation. The input data 264 comprising the text string or other data representation may be processed to determine the command to be executed. For example, the utterance of the command "robot, come here" may result in input data 264 comprising the text string "come here". The wakeword "robot" may be omitted from the input data 264. The input data 264 may then be provided to the navigation module 170.

The AMD 104 may move responsive to a determination made by an onboard processor 120, in response to a command received from one or more communication interfaces 204, as determined from the sensor data 132, and so forth. For example, an external server 194 may send a command that is received using the network interface 208. This command may direct the AMD 104 to proceed to find a particular user 106, follow a particular user 106, and so forth. The AMD 104 may then process this command and use the navigation module 170 to determine the directions and distances associated with carrying out the command. For example, the command to "come here" may result in the task module 180 determining the target pose based on the user pose data, and sending a command to the navigation module 170 to move the AMD 104 to the target pose.

The AMD 104 may connect to the network 192 using one or more of the network interfaces 208. In some implementations, one or more of the modules or other functions described here may execute on the processors 120 of the AMD 104, on the server 194, or a combination thereof. For example, one or more servers 194 may provide various functions, such as ASR, natural language understanding (NLU), providing content such as audio or video to the AMD 104, and so forth.

The other modules 240 may provide other functionality, such as object recognition, speech synthesis, user identification, and so forth. The other modules 240 may comprise a speech synthesis module that is able to convert text data to human speech. For example, the speech synthesis module may be used by the AMD 104 to provide speech that a user is able to understand.

The data store 214 may store the other data 270 as well. For example, localization settings may indicate local preferences such as language, user identifier data may be stored that allows for identification of a particular user, and so forth. The data store 214 may also store values for various thresholds as threshold data 268.

Modules described herein may provide various processing functions such as de-noising, filtering, and so forth. Processing of sensor data 132, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 132. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 132 or other data. For example, the ANN may be trained using a supervised learning algorithm such that object identifiers are associated with images of particular objects within training images provided to the ANN. Once trained, the ANN may be provided with the sensor data 132 and produce output indicative of the object identifier.

Figure 3:
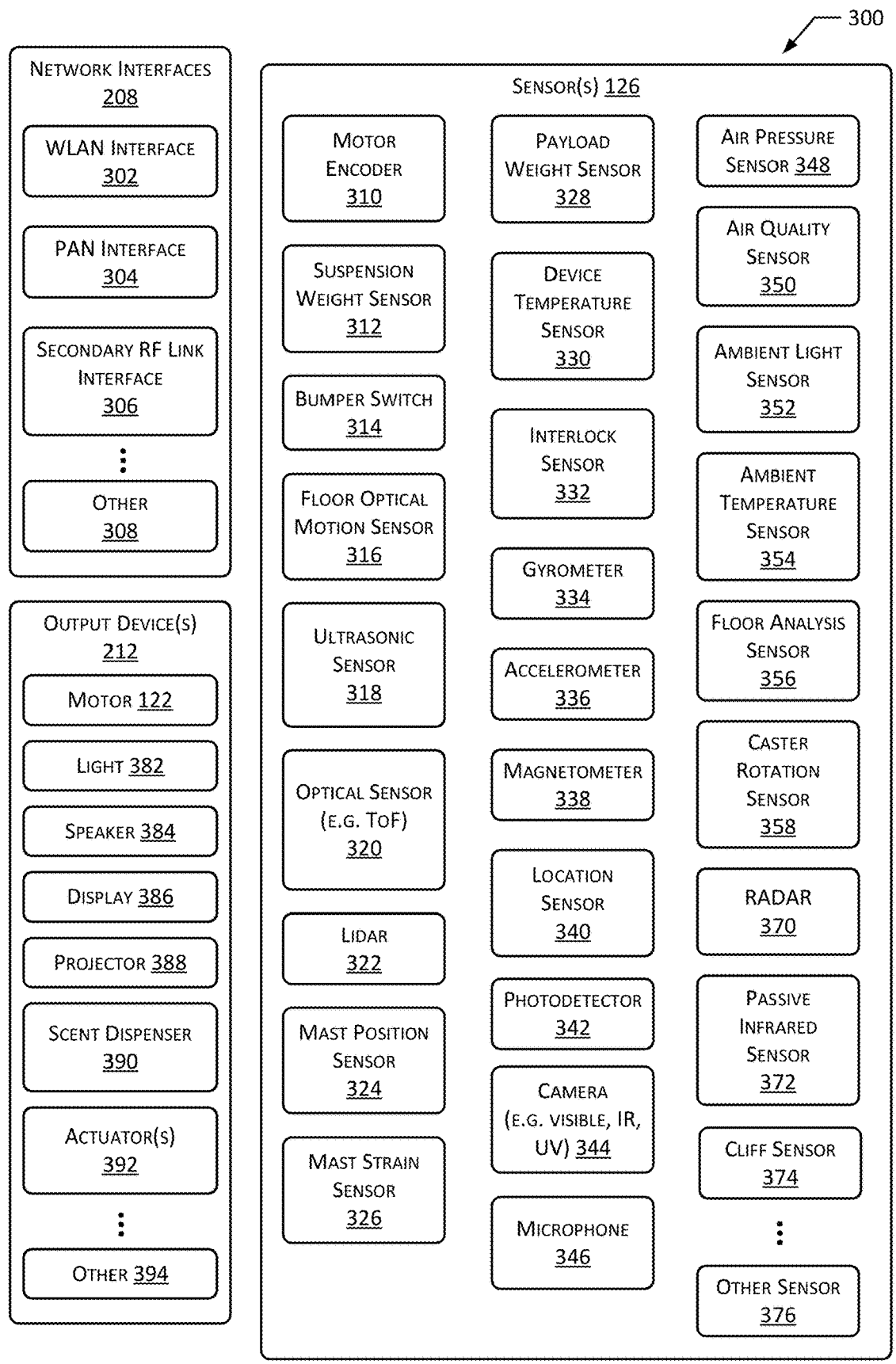
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 208, output devices 212, or sensors 126 depicted here, or may utilize components not pictured. One or more of the sensors 126, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 196 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, dock 190, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 126. The sensors 126 depicted here are provided by way of illustration and not necessarily as a limitation. It is understood that other sensors 126 may be included or utilized by the AMD 104, while some sensors 126 may be omitted in some configurations.

A motor encoder 310 provides information indicative of the rotation or linear extension of a motor 122. The motor 122 may comprise a rotary motor, or a linear actuator. In some implementations, the motor encoder 310 may comprise a separate assembly such as a photodiode and encoder wheel that is affixed to the motor 122. In other implementations, the motor encoder 310 may comprise circuitry configured to drive the motor 122. For example, the navigation module 170 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 224 may use data from the suspension weight sensor 312 to determine whether or not to inhibit operation of one or more of the motors 122. For example, if the suspension weight sensor 312 indicates no weight on the suspension, the implication is that the AMD 104 is no longer resting on its wheels, and thus operation of the motors 122 may be inhibited. In another example, if the suspension weight sensor 312 indicates weight that exceeds a threshold value, the implication is that something heavy is resting on the AMD 104 and thus operation of the motors 122 may be inhibited. For example, the threshold value may comprise a weight of a load that compresses a suspension system to a minimum height, or results in a mass that exceeds a torque output of the motors 122 to maintain a minimum acceleration.

One or more bumper switches 314 provide an indication of physical contact between a bumper or other member that is in mechanical contact with the bumper switch 314. The safety module 224 utilizes sensor data 132 obtained by the bumper switches 314 to modify the operation of the AMD 104. For example, if the bumper switch 314 associated with a front of the AMD 104 is triggered, the safety module 224 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 126 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 132 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 100 FOV, allowing the sensor to have an overall FOV of 40°.

In another implementation, a structured light pattern may be provided by the optical emitter. A portion of the structured light pattern may then be detected on the object using a sensor 126 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 224 and the navigation module 170 may utilize the sensor data 132 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 132 may be generated that is indicative of the presence of objects and the relative positions, shapes, and so forth that are visible to the lidar 322. Data from the lidar 322 may be used by various modules. For example, the navigation module 170 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 224. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 224 may utilize sensor data 132 obtained by the mast strain sensor 326. For example, if the strain applied to the mast exceeds a threshold amount, the safety module 224 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 224 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 124, one or more motors 122, and so forth. In the event the temperature exceeds a threshold value, the component associated with that device temperature sensor 330 may be shut down. For example, the threshold value may be determined based on component specifications, such as a maximum permissible temperature of the batteries 124.

One or more interlock sensors 332 may provide data to the safety module 224 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 132 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 132 indicative of impinging light. For example, the photodetector 342 may provide data indicative of a color, intensity, duration, and so forth.

A camera 344 generates sensor data 132 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 132 comprising images being sent to the navigation module 170. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the navigation module 170 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 224, the navigation module 170, the task module 180, and so forth. For example, if the floor analysis sensor 356 determines that the floor is wet, the safety module 224 may decrease the speed of the AMD 104 and generate a notification alerting the user 106.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 490 at a second time.

The sensors 126 may include a radar 370. The radar 370 may be used to provide information as to a distance, lateral position, and so forth, to an object.

The sensors 126 may include a passive infrared (PIR) sensor 372. The PIR sensor 372 may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, the cliff sensors 374 may be time-of-flight sensors that have a field of view directed downward toward a floor over which the AMD 104 is moving.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 102 to provide landmarks for the navigation module 170. One or more touch sensors may be utilized to determine contact with a user 106 or other objects.

The AMD 104 may include one or more output devices 212. A motor 122 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 106. Continuing the example, a motor 122 with an eccentric weight may be used to create a buzz or vibration to allow the AMD 104 to simulate the purr of a cat.

Figure 4:
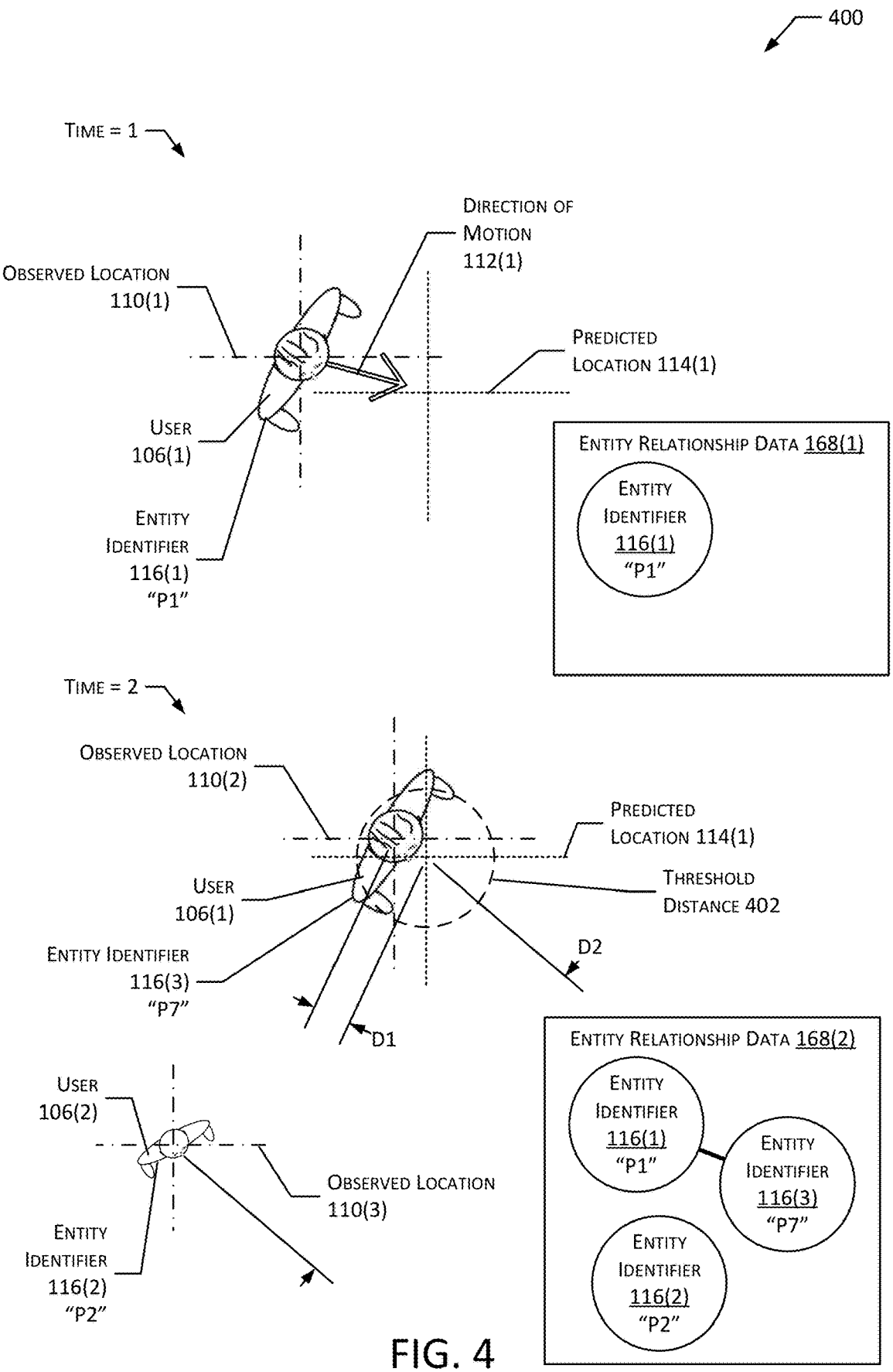
FIG. 4 illustrates assessing a distance between an observed location and a predicted location to assert an entity identifier, according to some implementations.

FIG. 4 illustrates at 400 assessing a distance between an observed location 110 and a predicted location 114 to assert an entity identifier 116, according to some implementations. In some situations, the entity ID 116 may change from time to time. For example, at the first time t=1 the user 106(1) may be associated with the first entity ID 116(1) "P1", while at time t=2 the same user 106(1) is associated with another entity ID 116(3) "P7". In one implementation, entity relationship data 168 indicative of an association between entity IDs 116 may be determined based at least in part on a distance D1 between an observed location 110 and a predicted location 114 being less than a threshold distance 402.

In this illustration, at a first time t=1 the first observed location 110(1), first direction of motion 112(1), and a predicted location 114(1) of the user 106(1) are shown. The entity relationship data 168(1) comprises the entity identifier 116(1) "P1".

At a second time t=2 a second observed location 110(2) of the first user 106(1), based on the sensor data 132 acquired at that second time, is compared to the previous predicted location 114(1). Because the second observed location 110(2) of the user 106(1) is within the threshold distance 402 of the predicted location 114, the entity ID module 160 may determine entity relationship data 168(2) that indicates the first entity ID 116(1) "P1" is associated with the entity ID 116(3) "P7".

In comparison, also at the second time t=2, a distance D2 between a third observed location 110(3) of the second user 106(2) and the first predicted location 114(1) is greater than the threshold distance 402, and thus no relationship is specified in the entity relationship data 168(2).

Figure 5:
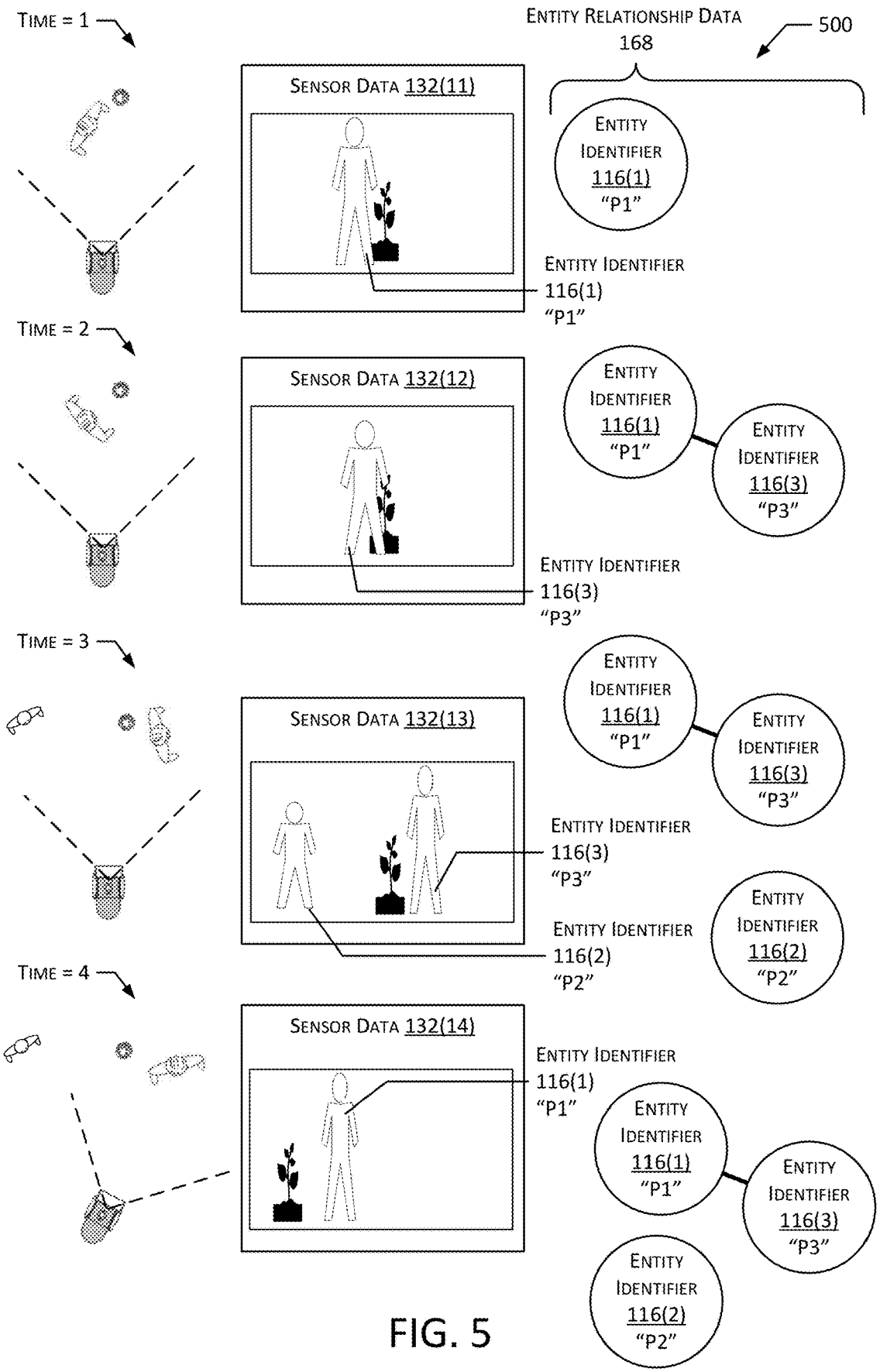
FIG. 5 illustrates sensor data from various times and associated entity relationship data, according to some implementations.

FIG. 5 illustrates at 500 sensor data 132 from various times and associated entity relationship data 168, according to some implementations. In this illustration, times t=1 through t=4 are shown with an overhead view of the relative arrangement of the AMD 104 and user(s) 106, sensor data 132(11)-(14) obtained from the sensor 126 on the AMD 104, and corresponding entity relationship data 168 associated with that time.

At time t=1 the first user 106(1) is represented in the sensor data 132(11), and the entity ID module 160 asserts a first entity ID 116(1) with the first user 106(1). The entity relationship data 168 indicates the first entity ID 116(1).

At time t=2 the first user 106(1) is represented in the sensor data 132(12), and the entity ID module 160 asserts a third entity ID 116(3) with the first user 106(1). For example, at time t=2 the first user 106(1) has turned away from the AMD 104, resulting in different features of the user 106 (such as their back) being visible to the entity ID module 160. However, the entity ID module 160 has determined that a relationship between the first entity ID 116(1) and the third entity ID 116(3) exists. For example, based at least in part on the observed location 110 of the user 106(1) depicted in the sensor data 132(12) being within the threshold distance 402 of the predicted location 114, the first entity ID 116(1) is associated with the third entity ID 116(3).

At time t=3, the second user 106(2) has entered the sensor FOV 118, and so both the first user 106(1) and the second user 106(2) are represented in the sensor data 132(13). The entity ID module 160 asserts the third entity ID 116(3) with the first user 106(1), and the second entity ID 116(2) with the second user 106(2). However, as shown by the corresponding entity relationship data 168, there is no association at this time between the first entity ID 116(1) and the second entity ID 116(2).

At time t=4, the AMD 104 has moved, removing the second user 106(2) from the sensor FOV 118, while the first user 106(1) is still within the sensor FOV 118. As a result, only the first user 106(1) is represented in the sensor data 132(14). However, at this time, the first user 106(1) has turned towards the AMD 104, and so the entity ID module 160 again asserts the first entity ID 116(1) with the first user 106(1). The entity relationship data 168 may persist across time, such as shown at time t=4. For example, the entity relationship data 168 may be maintained for a specified length of time, specified number of frames of sensor data 132, until a task is completed, and so forth.

The AMD 104 may be operated based on the entity relationship data 168. For example, if the AMD 104 was given an instruction to "follow me" by the first user 106(1), the AMD 104 would follow the entity associated with the first entity ID 116(1), and then the third entity ID 116(3), disregarding other entities, such as the second user 106(2). As a result, system performance is improved. For example, without the use of these techniques described herein, the AMD 104 having received the instruction at time t=1 to "follow me" would have entered an error state at time t=2 due to the apparent disappearance of the first entity ID 116(1).

Figure 6:
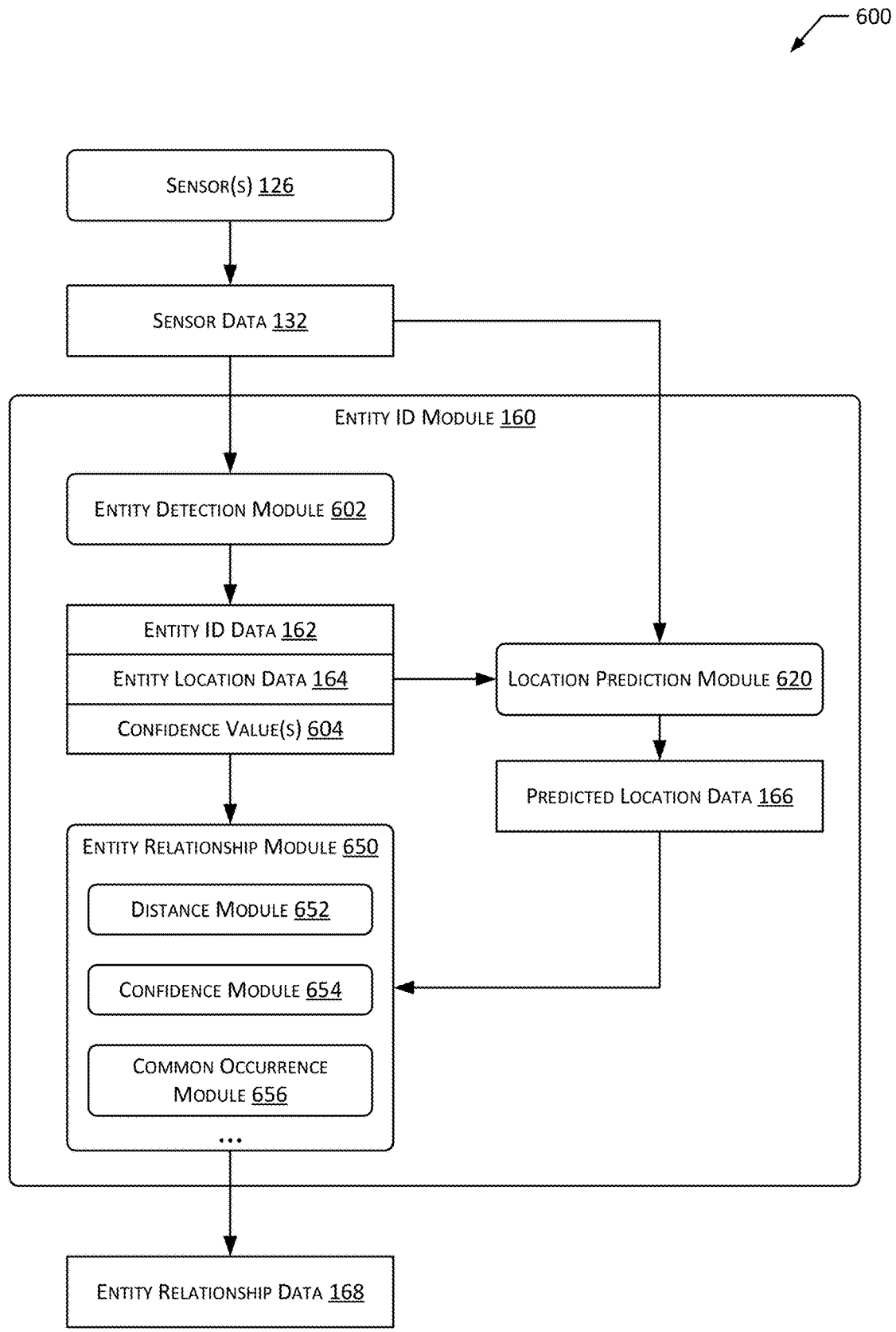
FIG. 6 is a block diagram of an entity identification module, according to some implementations.

FIG. 6 is a block diagram 600 of the entity ID module 160, according to some implementations. One or more sensors 126 acquire sensor data 132. For example, the one or more sensors 126 may comprise one or more of optical sensors 320, LIDAR 322, cameras 344, and so forth. In some implementations, the sensor data 132 may comprise frames, each frame representing data acquired during a particular time interval. For example, the sensor 126 may comprise a camera 344 that provides 30 individual images, or frames, of data each second during operation.

An entity detection module 602 detects one or more entities that are represented by the sensor data 132. In some implementations, the entity detection module 602 may utilize one or more machine learning systems to determine output data. For example, the entity detection module 602 may use one or more trained neural networks to determine presence of an entity within an image. In some implementations, the entity detection module 602 may operate on individual frames of sensor data 132.

The entity detection module 602 may provide as output the entity ID data 162 indicative of one or more entity IDs 116 represented in the sensor data 132 and the entity location data 164 indicative of the observed location 110 of the entity with respect to the physical space 102. In some implementations, the entity location data 164 may be determined using one or more other modules.

The entity detection module 602 may also provide as output a confidence value 604 that is indicative of a likelihood that an entity ID 116 has been properly associated with an entity. For example, a trained machine learning system may provide as output a confidence value 604 indicating a likelihood that the determined entity ID 116 is correct. Under ideal conditions such as sensor angle relative to the entity, lighting, and so forth, the confidence value may be 0.99 indicating a very high confidence. In comparison, under poor conditions such as oblique sensor angle relative to the entity, poor lighting, and so forth, the confidence value may be 0.11 indicating a low confidence value. Based on the confidence value, an association between a given entity ID 116 and another entity ID 116 may be made or removed. In one implementation, the confidence value may be compared to a threshold confidence value. For example, at time t=1 the confidence value for entity ID "P1" is 0.99. At time t=2 the confidence value for entity "P2" is 0.98. Given a threshold confidence value of 0.90, the confidence value for entity "P2" at 0.98 is greater than 0.90, and so is deemed to not be associated with "P1". In comparison if at time t=2 the confidence value for entity "P2" is 0.05, less than the threshold confidence value of 0.90, and so the entity ID "P2" may be deemed to be associated with the entity ID "P1".

In other implementations, other confidence values 604 may be determined. For example, an entity detection confidence value may be determined that is indicative of a confidence that an entity has been detected. For example, the entity detection confidence value may be indicative of a likelihood that an entity has actually been detected, as distinct from a likelihood of identifying that particular entity.

A location prediction module 620 may determine the predicted location data 166. In one implementation, the location prediction module 620 may use a time series of two or more observed locations 110 as indicated by the entity location data 164 to determine the predicted location 114 indicated by the predicted location data 166. For example, a speed may be determined based on the observed displacement between two successive observed locations 110, and the direction may be determined based on the change in coordinates of those successive observed locations 110.

In other implementations, the location prediction module 620 may use other techniques. For example, a machine learning system may provide information indicative of an estimated direction of motion 112 based on a single frame of sensor data 132 based on the user's apparent body posture, apparent orientation relative to the sensor 126, and so forth. Continuing the example, based on the placement of the user's body, an estimated direction of motion 112 may be inferred and a predetermined speed value may be assigned to determine the predicted location data 166. In some implementations, the location prediction module 620 may utilize a Kalman filter to determine the predicted location data 166.

In another implementation, the location prediction module 620 may determine the predicted location data 166 using a first speed and the entity location data 164. For example, given the entity location data 164 and assuming movement at the first speed in any direction, the predicted location data 166 may specify an area within which the entity is predicted to be. This implementation operates without using the estimated direction of motion 112 and may be based on a single frame of sensor data 132. The first speed may be a fixed value, may be associated with a particular user account, may be based on the height of the entity, and so forth. For example, the first speed may be specified as 0.7 m/s. In another example, a lookup table or other data structure may be used to determine the first speed based on a height of the entity such that taller entities are associated with greater speeds.

An entity relationship module 650 may accept as input the data from these modules and use one or more assessments to determine the entity relationship data 168. The entity relationship module 650 may include one or more of a distance module 652, a confidence module 654, a common occurrence module 656, and so forth. The entity relationship module 650 may utilize data obtained from a single frame of sensor data 132 or multiple frames of sensor data 132.

The distance module 652 may be used to compare the entity location data 164 with the predicted location data 166 to determine a relationship between two or more entity IDs 116 as expressed in the entity relationship data 168. For example, if an observed location 110 as indicated by the entity location data 164 of an entity having a second entity ID 116(2) is within the threshold distance 402 of a predicted location 114 indicated by the predicted location data 166 that is associated with the first entity ID 116(1), the second entity ID 116(2) may be associated with the first entity ID 116(1).

The confidence module 654 may be used to determine a relationship between two or more entity IDs based at least in part on their associated confidence values 604. As mentioned above, the entity detection module 602 may provide as output confidence value(s) 604 indicating a likelihood that the determined entity ID 116 is correct. Based on changes in condition, training, processing, and so forth, the confidence values 604 may change over time. The confidence module 654 may use the confidence values 604 to determine whether an association between entity IDs 116 as expressed in the entity relationship data 168 should be added or removed. In one implementation, the confidence value may be compared to a threshold confidence value. A confidence value greater than the threshold confidence value may be deemed to be high confidence, while a confidence value less than the threshold confidence value may be deemed to be low confidence. In one implementation, a high confidence value 604 associated with assertion of the entity ID 116 may be indicative of differentiation between different entity IDs 116. For example, at time t=1 the confidence value 604(1) for entity ID 116(1) "P1" is 0.99. At time t=2 the confidence value 604(2) for entity "P2" is 0.98, which is greater than a threshold confidence value. Given the high confidence and "P2" being greater than the threshold confidence value, "P2" may be deemed to not be associated with "P1". In comparison if at time t=2 the confidence value 604 for entity "P2" is 0.05 and thus less than the threshold confidence value, the entity ID "P2" may be deemed to be associated with the entity ID "P1".

The common occurrence module 656 may determine if there is a common occurrence of entity IDs 116 that preclude those entity IDs 116 being associated with the same entity. In one implementation, the common occurrence module 656 may determine whether two or more entity IDs 116 simultaneously present in the same sensor data 132. If true, those entity IDs 116 may be deemed to not refer to the same entity. For example, if entity IDs "P1", "P3" and "P4" are all determined to be depicted in the same frame of image data, they may be deemed to be separate entities and thus not associated with one another. The common occurrence module 656 may use the confidence data 604 in some implementations. In one implementation, the common occurrence module 656 may omit input having confidence value(s) 604 less than a minimum confidence value. This may be used to avoid low confidence entity IDs 116 that may be misidentifying an entity from producing incorrect entity relationship data 168. In some implementations, the common occurrence module 656 may be based on multiple instances of data. For example, a threshold minimum number of simultaneous occurrences may be specified to be determined before an association between two entity IDs 116 is removed. Continuing the example, five simultaneous observations of P1 and P2 may be needed to remove the association in the entity relationship data 168 between the first entity ID 116(1) and the second entity ID 116(2). In another example, a minimum number of consecutive frames of sensor data 132 that indicate common occurrence may be specified before changing the entity relationship data 168.

Other information, such as the time at which sensor data 132 was acquired may also be considered. The sensor data 132 occurring within a specified threshold time duration may be considered by the entity relationship module 650 or the modules therein while determining the entity relationship data 168. For example, if the threshold time duration is specified at 100 milliseconds (ms), the entity relationship module 650 may perform the operations on sensor data 132 or resulting data such as entity ID data 162, entity location data 164, and so forth that results from the sensor data 132 within the last 100 ms time duration. Continuing the example, sensor data 132 and resulting data that occurs outside that threshold time duration may be disregarded. In some implementations, the entity relationship module 650 may use a time duration that comprises a "window" of time, extending backward from a current time.

In some implementations, the entity relationship module 650 may use information about whether an entity has been associated with a user account to determine the entity relationship data 168. A user identification module may determine a particular user account that is associated with a user 106. For example, the user identification module may use a password entered by the user 106, biometric identification, or other techniques to assert a particular identity that is associated with a particular account. Entity ID data 162 that are deemed to be associated with a common user account may be associated in the entity relationship data 168. For example, the entity ID 116(1) is associated with the user account for "Alice". Continuing the example, the entity ID 116(3) is also associated with the user account for "Alice". Based on this, entity ID 116(1) and 116(3) may be associated with each other in the entity relationship data 168.

In another example, if the user identification module determines different user accounts, or is unable to associate an entity with a user account, the entity relationship data 168 may indicate that two entity IDs 116 are not associated. For example, if the entity ID 116(1) is associated with the user account for "Alice", but the entity ID 116(2) is not associated with a user account, entity ID 116(1) may be deemed to be not associated with 116(2).

In some implementations, thresholds to add a relationship between entity IDs 116 may differ from thresholds to remove a relationship. For example, a lower threshold may be specified to associate entity IDs 116, while a greater threshold is required to disassociate entity IDs 116 in the entity relationship data 168. These asymmetric thresholds may improve operation of the AMD 104 in some instances, and may also improve the user experience. For example, it may be preferred to have the AMD 104 start by following the first user 106(1) and then, due to an error in association, follow the second user 106(2) rather than entering an error state. The incorrect following may be more readily understood and tolerated by users 106, while an outright failure may be deemed irritating.

The entity relationship data 168 may then be used to operate the AMD 104. As described above, instructions that involve interacting with a particular user 106 may utilize the entity relationship data 168 to provide appropriate operation. For example, by using the entity relationship data 168, even if the underlying entity detection modules 602 result in many changing entity IDs 116 over time, the overall operation of the AMD 104 remains consistent.

The output from one or more of the distance module 652, the confidence module 654, or the common occurrence module 656 may be used to determine the entity relationship data 168. For example, a relationship between entity IDs 116 may be added or removed based on output from one of the modules, a plurality of the modules, may be based on a weighted average of the output from the modules, and so forth.

Figure 7:
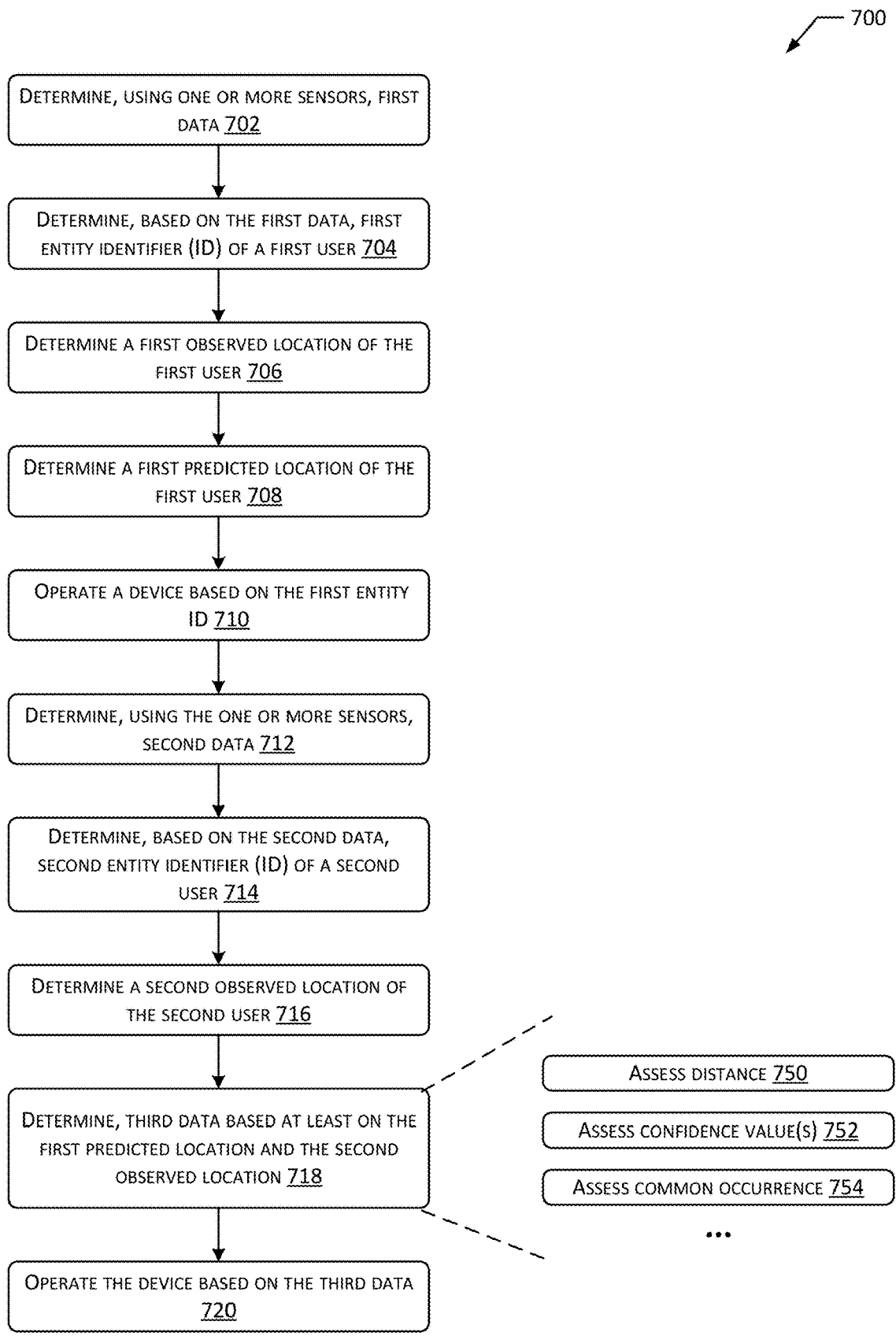
FIG. 7 is a flow diagram of a process to determine entity relationship data, according to some implementations.

FIG. 7 is a flow diagram 700 of a process to determine entity relationship data 168, according to some implementations. The process may be implemented at least in part by one or more of the processors 120.

At 702, using one or more sensors 126, first data is determined that is associated with a first time. For example, the camera 344 may acquire sensor data 132(1) comprising a first frame of image data at time t=1.

At 704, based on the first data, a first entity ID 116(1) of a user 106(1) as represented by the first data is determined. For example, the entity detection module 602 may determine the entity ID data 162 indicative of the first entity ID 116(1).

At 706 a first observed location 110(1) of the user 106(1) as represented by the first data is determined. For example, the entity detection module 602 may determine, based on the first data, first entity location data 164(1). In one implementation, the entity location data 164 may specify the location as a pair of coordinates with respect to an X axis and a Y axis. The X axis and the Y axis may define a plane that is horizontal.

At 708 a first predicted location 114 of the first user 106(1) is determined. For example, the location prediction module 620 may determine the predicted location data 166 based on the first observed location 110(1) as indicated by the first entity location data 164(1).

At 710 a device, such as the AMD 104, is operated based on the first entity ID 116 as indicated by the entity ID data 162.

At 712, using one or more sensors 126, second data is determined that is associated with a second time. For example, the camera 344 may acquire sensor data 132(2) comprising a second frame of image data at time t=2. In some implementations, a determination may be made (not shown) as to whether a time duration between the first time and the second time is less than a threshold. If yes, the process may proceed. If not, the process may stop. For example, if the time duration threshold is 100 ms and the difference between the first time and the second time is less than or 100 ms, the process may proceed to 714.

At 714, based on the second data, a second entity ID 116(2) of a second user 106(2) as represented by the second data is determined. For example, the entity detection module 602 may determine the entity ID data 162 indicative of the second entity ID 116(2). The user 106(1) and the second user 106(2) may be the same person, or different people.

At 716 a second observed location 110(2) of the second user 106(2) as represented by the second data is determined. For example, the entity detection module 602 may determine, based on the second data, the second entity location data 164(2).

At 718 third data is determined. For example, the third data may comprise the entity relationship data 168 or a portion thereof. In one implementation, the third data may be based at least in part on the first predicted location 114(1) and the second observed location 110(2). For example, if the second observed location 110(2) is within the threshold distance 402 of the first predicted location 114(1), the second entity ID 116(2) may be associated with the first entity ID 116(1) in the entity relationship data 168.

As described above, the determination of the third data may include one or more of: an assessment of distance 750 as performed by the distance module 652, an assessment of confidence values 752 as performed by the confidence module 654, or assessment of common occurrence 754 as performed by the common occurrence module 656. In some implementations, the time at which data was acquired may be used to determine the third data. For example, if a time duration between the first time and the second time exceeds a threshold, no relationship as specified in the entity relationship data 168 may be determined. In comparison, if a time duration between the first time and the second time is less than a threshold, a relationship as specified in the entity relationship data 168 may be determined.

In some implementations, different threshold time durations may be used for different assessments, different sensor data 132, and so forth. For example, a first threshold time duration for sensor data 132 used to assess distance 750 may be a first value, such as 100 ms, while a second threshold time duration for assessment of common occurrence 754 may be 40 ms.

At 720 the device, such as the AMD 104, is operated based on the third data. For example, based on the entity relationship data 168 indicating that the first entity ID 116(1) and the third entity ID 116(3) are associated with the same entity, an instruction to follow the first user 106(1) who is associated with the first entity ID 116(1) would result in the AMD 104 following the first entity ID 116(1) or the third entity ID 116(3).

The operation may cause the device to one or more of, present visual output on a display device 386, present audible output using a speaker 384, move a display device 386, operate one or more actuators 392, move a manipulator arm, move the device to a target pose, wherein the target pose is based on the entity location data 164, or other actions. For example, after receiving an instruction to do so, the device may one or more of pan or tilt a camera 344 to keep a particular user 106 within the FOV 118. In another example, if the AMD 104 is to follow the user 106, the estimated location data 164 associated with the entity ID(s) 116 may be provided to the navigation module 170 that determines and implements path plan data 266 to autonomously move the AMD 104 to follow the user 106.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

What is claimed is:

1. An autonomous mobile device (AMD) comprising:
   one or more sensors that acquire data about a physical space;
   one or more non-transitory memories storing computer-executable instructions; and
   one or more processors to execute the computer-executable instructions to:
   determine first data using the one or more sensors at a first time;
   determine, based on the first data: (i) a first identifier (ID) associated with a first user represented in the first data, and (ii) a first location, with respect to the physical space, of the first user;
   determine second data using the one or more sensors at a second time;
   determine, based at least on the second data: (iii) a second ID associated with a second user represented in the second data, and (iv) a second location, with respect to the physical space, of the second user;
   determine, based at least on the first data and the second data, that the first ID is associated with the second ID; and
   operate the AMD based on the first ID being associated with the second ID.

2. The AMD of claim 1, wherein the instructions to determine that the first ID is associated with the second ID include instructions to:
   determine that a time duration between the second time and the first time is less than a threshold.

3. The AMD of claim 1, wherein the one or more processors further execute the computer-executable instructions to:
   determine, based at least in part on the first data:
   a first direction of motion of the first user, and
   a first speed of the first user;
   determine a first predicted location based on the first direction of motion and the first speed; and
   wherein the instructions to determine that the first ID is associated with the second ID are further based on the second location being less than a threshold distance from the first predicted location.

4. The AMD of claim 1, wherein the one or more processors further execute the computer-executable instructions to:
   determine, based at least in part on the first data, a first speed of the first user;
   determine a first predicted location based on the first location and the first speed; and
   wherein the instructions to determine that the first ID is associated with the second ID are further based on the second location being less than a threshold distance from the first predicted location.

5. The AMD of claim 1, wherein the one or more processors further execute the computer-executable instructions to:
   determine, based at least in part on the second data, that the first ID is not represented in the second data.

6. The AMD of claim 1, wherein the instructions to determine that the first ID is associated with the second ID include instructions to:
   determine a confidence value associated with the second ID is less than a threshold confidence value.

7. The AMD of claim 1, wherein the instructions to determine that the first ID is associated with the second ID include instructions to:
   determine a first user account associated with the first user; and
   determine the first user account is associated with the second user.

8. An autonomous mobile device (AMD) comprising:
   one or more sensors that acquire data about a physical space;
   one or more non-transitory memories storing computer-executable instructions; and
   one or more processors to execute the computer-executable instructions to:

determine first data using the one or more sensors at a first time;

determine, based on the first data, (i) a first identifier (ID) associated with a first user represented in the first data, and (ii) a first location, with respect to the physical space, of the first user;

determine second data using the one or more sensors at a second time;

determine, based at least on the second data, (iii) a second ID associated with a second user represented in the second data, and (iv) a second location, with respect to the physical space, of the second user;

determine, based at least on the first data and the second data, that the first ID is not associated with the second ID; and operate the AMD based on the first ID not being associated with the second ID.

9. The AMD of claim 8, wherein the instructions to determine that the first ID is not associated with the second ID include instructions to:

determine that a time duration between the first time and the second time exceeds a threshold.

10. The AMD of claim 8, wherein the one or more processors further execute the computer-executable instructions to:

determine, based at least in part on the first data:
a first direction of motion of the first user, and
a first speed of the first user;

determine a first predicted location based on the first direction of motion and the first speed; and wherein the instructions to determine that the first ID is not associated with the second ID are further based on one or more of:
the second location being greater than a threshold distance from the first predicted location, or
a time duration between the second time and the first time exceeding a threshold.

11. The AMD of claim 8, wherein the one or more processors further execute the computer-executable instructions to:

determine, based at least in part on the first data, a first speed of the first user;

determine a first predicted location based on the first speed and the first location; and wherein the instructions to determine that the first ID is not associated with the second ID are further based on the second location being greater than a threshold distance from the first predicted location.

12. The AMD of claim 8, wherein the second data further includes the first ID and wherein:

the instructions to determine that the first ID is not associated with the second ID are further based at least in part on both the first ID and the second ID being represented in the second data.

13. The AMD of claim 8, wherein the instructions to determine that the first ID is not associated with the second ID include instructions to:

determine a confidence value associated with the second ID is greater than a threshold confidence value.

14. A method comprising:

determining first data using one or more sensors;

determining, based on the first data:
a first identifier (ID) associated with a first user represented in the first data, and
a first location, with respect to a physical space, of the first user;

determining second data using the one or more sensors;

determining, based on the second data:
a second ID associated with a second user represented in the second data, and
a second location, with respect to the physical space, of the second user;

determining third data based at least in part on the first data and the second data; and operating a device based on the third data.

15. The method of claim 14, wherein the first data is associated with a first time and the second data is associated with a second time; and the method further comprising:

determining, based on the first data, a first predicted location;

determining that a time duration between the second time and the first time is less than a threshold;

determining that the second location is within a threshold distance of the first predicted location; and wherein the third data indicates that the second ID is associated with the first ID.

16. The method of claim 14, further comprising:

determining, based on the first data, a first predicted location;

determining that the second location is greater than a threshold distance from the first predicted location; and wherein the third data indicates that the first ID is not associated with the second ID.

17. The method of claim 14, further comprising:

determining that the first ID is not represented in the second data; and wherein the third data indicates that the first ID is associated with the second ID.

18. The method of claim 14, further comprising:

determining that the first ID is represented in the second data; and wherein the third data indicates that the first ID is not associated with the second ID.

19. The method of claim 14, further comprising:

determining a confidence value associated with the second ID is less than a threshold confidence value; and wherein the third data indicates that the first ID is associated with the second ID.

20. The method of claim 14, further comprising:

determining a confidence value associated with the second ID is greater than a threshold confidence value; and wherein the third data indicates that the first ID is not associated with the second ID.

* * * * *